(12) United States Patent
Chien

(10) Patent No.: US 12,436,910 B2
(45) Date of Patent: Oct. 7, 2025

(54) METHOD AND APPARATUS TO DYNAMICALLY DISABLE ETHERNET PORTS DURING SYSTEM POWER ON

(71) Applicant: Intel Corporation, Santa Clara, CA (US)

(72) Inventor: Chia-yi Chien, Taipei (TW)

(73) Assignee: Intel Corporation, Santa Clara, CA (US)

( * ) Notice: Subject to any disclaimer, the term of this patent is extended or adjusted under 35 U.S.C. 154(b) by 707 days.

(21) Appl. No.: 17/539,437

(22) Filed: Dec. 1, 2021

(65) Prior Publication Data
US 2022/0092014 A1 Mar. 24, 2022

(51) Int. Cl.
G06F 1/28 (2006.01)
G06F 13/40 (2006.01)
G06F 21/70 (2013.01)

(52) U.S. Cl.
CPC .......... G06F 13/4068 (2013.01); G06F 1/28 (2013.01); G06F 21/70 (2013.01)

(58) Field of Classification Search
CPC .... G06F 13/4068; G06F 1/28; G06F 11/1441; G06F 11/1402; G06F 11/1417; G06F 21/81; G06F 21/70
See application file for complete search history.

(56) References Cited

U.S. PATENT DOCUMENTS

| | | | |
|---|---|---|---|
| 5,925,132 A | 7/1999 | Kadokura | |
| 2012/0126868 A1* | 5/2012 | Machnicki | H03L 7/07 327/158 |
| 2015/0146745 A1* | 5/2015 | Kim | G06F 1/32 370/466 |
| 2017/0154009 A1* | 6/2017 | Zhu | G06F 13/4282 |
| 2020/0106639 A1* | 4/2020 | Pannell | H04L 12/40136 |

OTHER PUBLICATIONS

Anonymous, "Atmel XMEGA A Manual", Nov. 1, 2012 (Nov. 1, 2012), pp. 1-432, XP093034780, Retrieved from the Internet: URL:https://web.archive.org/web/2019041714 2740if_/http://ww1.microchip.com/downloads /en/ DeviceDoc/doc8077.pdf, [retrieved on Mar. 27, 2023] p. 263-p. 282, 20 pages.
Extended European Search Report for Patent Application No. 22201674.3, Mailed Apr. 4, 2023, 9 pages.
"SFF-8431 Specifications for Enhanced Small Form Factor Pluggable Module SFP+" SFF Committee, I. Dal Allan, Chairman, Jul. 6, 2009, 132 pages.

* cited by examiner

*Primary Examiner* — Tim T Vo
*Assistant Examiner* — Richard B Franklin
(74) *Attorney, Agent, or Firm* — Compass IP Law PC

(57) ABSTRACT

During system power-on, Ethernet controllers in a server are initialized and configured by a Power-On-Reset (POR) mechanism. A user-defined time period can be selected to delay configuration of an Ethernet link to allow sufficient time for completion of the initialization of the Ethernet controller for post-boot operation. After configuration of an Ethernet PHY in the Ethernet controller is complete, an Ethernet link is established by exchanging messages with link partners according to the Ethernet protocol.

20 Claims, 4 Drawing Sheets

| Bit(s) | Field Name | Description |
|---|---|---|
| 0 | Enable Dynamic Ports | Enable/Disable Dynamic Ports |
| 4:1 | Port Number | Select port(s) to enable |
| 14:5 | Delay Time | Number of seconds to delay port(s) enable |
| 15 | Reserved | |

METHOD AND APPARATUS TO DYNAMICALLY DISABLE ETHERNET PORTS DURING SYSTEM POWER ON

BACKGROUND

Local Area Networks (LANs) and Metropolitan Area Networks (MANs) may use the Institute of Electrical and Electronics Engineers (IEEE) 802.3 (Ethernet) protocol and frame format for data communication. The Ethernet protocol uses a common media access control (MAC) sublayer of a data link layer in the Open Systems Interconnection model (OSI model). The OSI model is a conceptual model that partitions a communication system into abstraction layers. The MAC sublayer is responsible for transferring data to and from a Physical Layer and encapsulates frames received from upper layers (for example, frames received from a network layer in the OSI reference model) into frames appropriate for the transmission medium. Speed specific Media Independent Interfaces (MIIs) provide an interface to the physical layer that encodes frames for transmission and decodes received frames with the modulation specified for the speed of operation, transmission medium and supported link length.

A data center can include a plurality of servers, with each server including one or more Network Interface Controllers (NICs). During system power-on, NICs in a server are initialized and configured by a Power-On-Reset (POR) mechanism. After configuration of an Ethernet PHY in the NIC is complete, an Ethernet link is established by exchanging messages with link partners according to the Ethernet protocol.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

An Ethernet link is established prior to initialization of the Basic Input/Output System (BIOS), Unified Extensible Firmware Interface (UEFI), or boot loaders, and loading of operating system device drivers to initialize the Ethernet controller for post-boot operation. The time period between establishing the Ethernet link and completion of the initialization of an Ethernet controller for post-boot operation allows the Ethernet link to be used to insert a malicious program in the system or to access data stored in the system.

A user-defined time period can be selected to delay configuring the Ethernet link after a power on reset to allow sufficient time for completion of the initialization of the Ethernet controller for post-boot operation.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
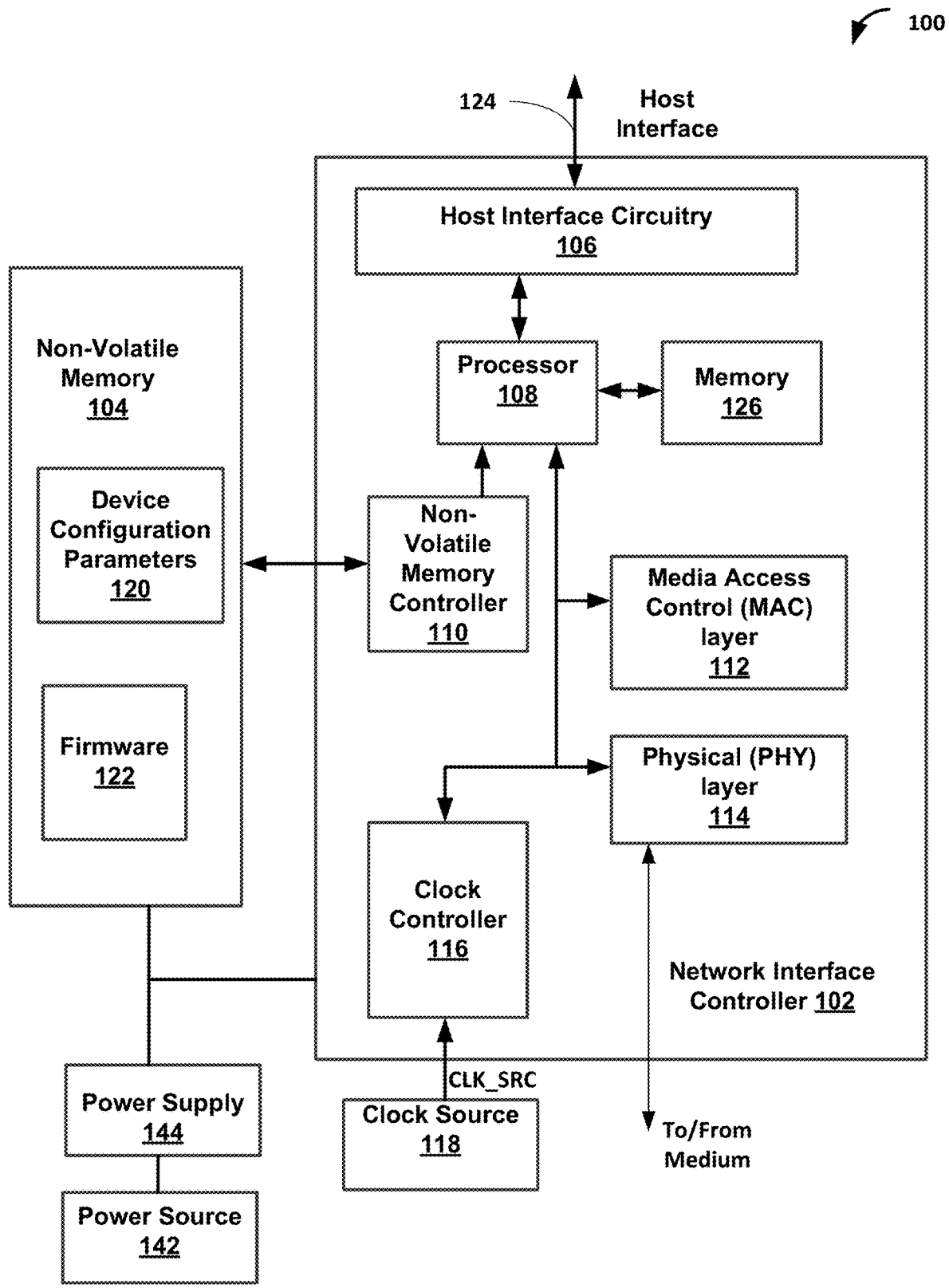
FIG. 1 is a block diagram of a system 100 that includes a network interface controller to delay enabling an Ethernet link after a power on reset to allow sufficient time for completion of the configuration of the network interface controller for post-boot operation.

FIG. 1 is a block diagram of a system 100 that includes a network interface controller 102 to delay enabling an Ethernet link after a power on reset to allow sufficient time for completion of the configuration of the network interface controller 102 for post-boot operation. The network interface controller 102 includes host interface circuitry 106, a processor 108, a non-volatile memory controller 110, media access control (MAC) layer circuitry 112, physical (PHY) layer circuitry 114, memory 126 and a clock controller 116.

Ethernet ports include the media access control layer circuitry 112 and physical (PHY) layer circuitry 114. The processor 108 performs tasks in response to a power on reset that include tasks to initialize the media access control layer circuitry 112 and physical (PHY) layer circuitry 114 for Ethernet ports.

Non-volatile memory 104 includes a Serial Peripheral Interface (SPI) to communicate with the non-volatile memory controller 110 in the Network Interface Controller 102. The non-volatile memory 104 stores firmware 122, device configuration parameters 120 and identifiers, for example, Media Access Control (MAC) layer addresses.

The memory 126 is a volatile memory to store the firmware 122, the device configuration parameters 120 and identifiers that are also stored in non-volatile memory 104.

The Media Access Control layer circuitry 112 includes a plurality of full duplex Ethernet layer ports. In an embodiment there can be four full duplex Ethernet layer ports. The Media Access Control layer circuitry 112 uses the Ethernet protocol.

The physical (PHY) layer circuitry 114 (PHY circuitry) provides the plurality of Ethernet ports with integrated PHY interfaces to connect directly to a medium or to external PHYs. In an embodiment with four full duplex Ethernet MAC ports, the physical PHY circuitry 114 supports eight physical high speed SerDes lanes, two per Ethernet layer port.

The external clock source 118 outputs an electric signal with a constant frequency (CLK_SRC). The external clock source 118 can be a crystal oscillator.

The clock controller 116 receives CLK_SRC from the external clock source 118 and uses CLK_SRC to generate other clocks with different frequencies for use by the processor 108, the MAC layer circuitry 112 (MAC circuitry) and the PHY layer circuitry 114 in the network interface controller 102.

The host interface circuitry 106 is communicatively coupled over bus 124 to a host interface. In an embodiment, the host interface circuitry 106 may include a Peripheral Component Interconnect Express (PCIe) adapter that is communicatively coupled over bus 124 using the Peripheral Component Interconnect Express (PCIe) protocol to a host. The PCIe standards are available at www.pcisig.com.

Power source 142 provides power to the components of system 100. More specifically, power source 142 typically interfaces to one or multiple power supplies 144 in system 100 to provide power to the components of system 100. In one example, power supply 144 includes an AC to DC (alternating current to direct current) adapter to plug into a wall outlet. Such AC power can be renewable energy (e.g., solar power) power source 142. In one example, power source 142 includes a DC power source, such as an external AC to DC converter. In one example, power source 142 or power supply 144 includes wireless charging hardware to charge via proximity to a charging field. In one example, power supply 144 can include an internal battery or fuel cell source.

The system 100 is held in a reset state while the state of a power on reset signal indicates that the power source 142 is below the normal operation voltage.

Figure 2:
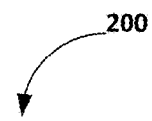
FIG. 2 is an embodiment of a dynamic port enable register used to delay configuring an Ethernet port for a delay time after a power on reset.

FIG. 2 is an embodiment of a dynamic port enable register 200 used to delay configuring an Ethernet port for a delay time after a power on reset In the embodiment shown, the dynamic port enable register 200 has 16-bits, with one of the 16-bits reserved (unused). One bit (bit 0 in the embodiment shown in FIG. 2) is used to select enabling delay of the enabling of the Ethernet port. The default when bit 0 is set to logic '0', is not to enable delay of the enabling of the Ethernet port. If bit 0 is set to logic '1', delay of the enabling of the Ethernet port is selected.

Four bits (bits 4:1 in the embodiment shown in FIG. 2.) of the dynamic port enable register 200 are used to select the ports to enable delay of the enabling of the respective Ethernet port. Each of the respective four bits are assigned to one of four communications ports (port 0, port 1, port 2, port 3). For example, if bits 4:1 are '0001b', one of the ports, for example, port 0 is selected and if bits 4:1 are '0101b' two of the ports, for example, port 0 and port 2 are selected.

Ten bits (bits 5:14 in the embodiment shown in FIG. 2) of the dynamic port enable register 200 are used to select a time to delay (delay time) configuring of the selected communication port(s). In one embodiment, the maximum delay time is 1023 seconds when bits 5:14 are '1111111111b' and the minimum delay time is 1 second when bits 5:14 are '0000000001b'. The time to delay can be selected to adapt to different systems with variable configurations. In other embodiments, the minimum delay time can be another unit of time, for example 1 microsecond, 1 millisecond or a packet transmission time.

One dynamic port enable register 200 is used in an embodiment in which one or more of the ports have the same delay time. In an embodiment in which the ports have different delay times, a dynamic port enable register 200 is assigned per port to store the delay time for the port.

The user-defined time period selected to delay configuration of an Ethernet link to allow sufficient time for completion of the initialization of the Ethernet controller for post-boot operation can be part of a security suite that may include encryption, cryptographic operation, authentication and resource partitioning.

The user-defined time period selected to delay configuration of an Ethernet link can be applied to other types of MACs and PHYs.

Figure 3:
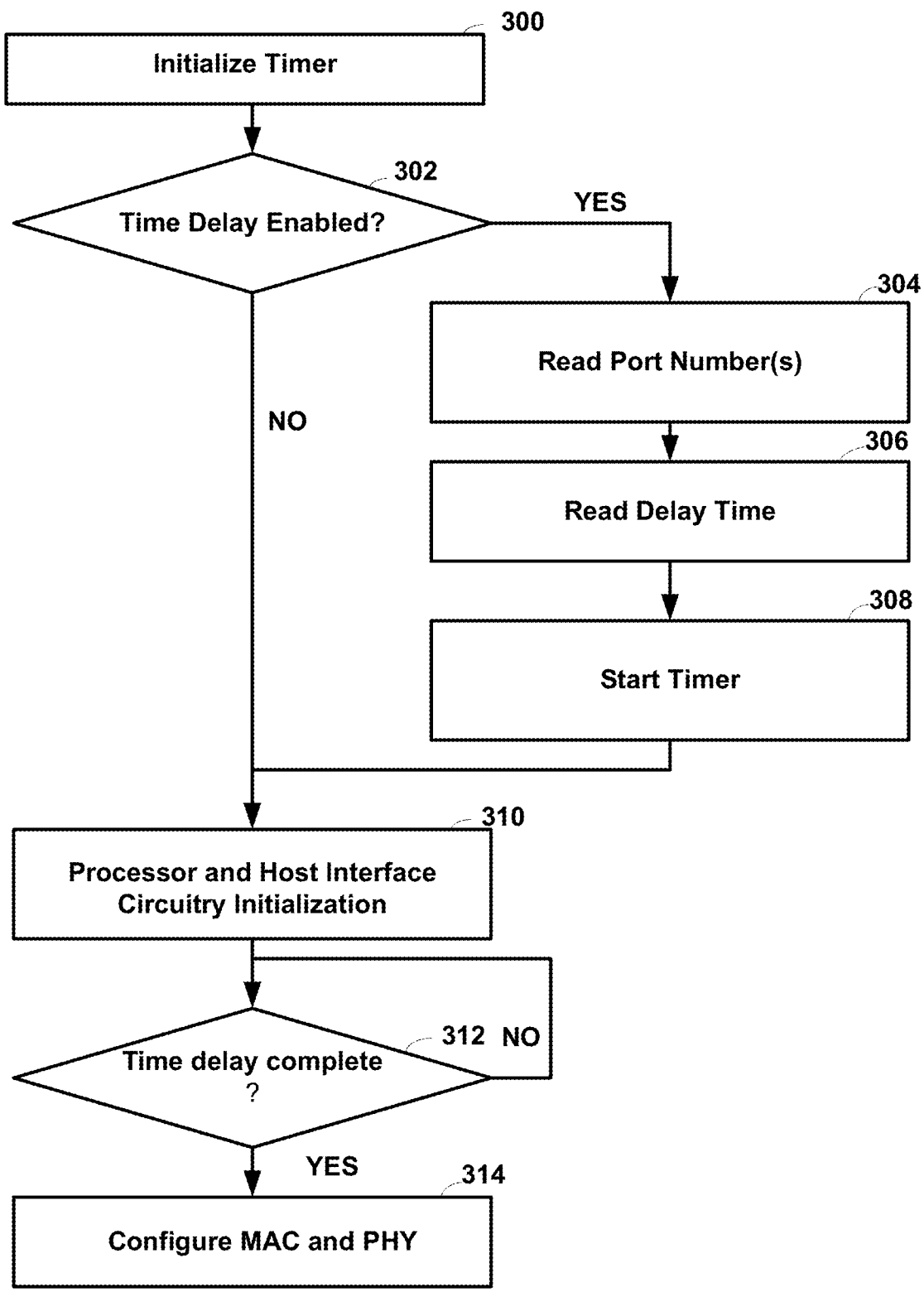
FIG. 3 is a flowgraph illustrating a method performed in system to delay configuring an Ethernet port in a NIC after a power on reset to allow sufficient time for completion of the configuration of the NIC for post-boot operation.

FIG. 3 is a flowgraph illustrating a method performed in system 100 to delay configuring an Ethernet port in a NIC 102 after a power on reset to allow sufficient time for completion of the configuration of the NIC 102 for post-boot operation.

At block 300, upon detecting power has been applied to the system 100, a link enable delay timer is selected to delay enabling of the Ethernet link. The link enable delay timer uses an internal clock generated by the clock controller 116 after an internal Phase-locked loop (PLL) locks during power on reset. The link enable delay timer can be a hardware timer in clock controller 116 or a software timer in firmware 122.

At block 302, upon detecting from the state of the power on reset signal that the power source 142 is no longer below normal operation range, the device configuration parameters 120 and firmware 122 are loaded from the non-volatile memory 104, segment by segment, by the non-volatile memory controller 110 into memory 126 for use by the processor 108.

The dynamic port enable register 200 in memory 126 is read by the processor 108. If the state of the bit in the dynamic port enable register 200 to select enabling delay of configuration of the Ethernet ports is "enable" (for example, bit 0 in the embodiment shown in FIG. 2 is set to logic r), processing continues with block 304. If not, processing continues with block 310.

At block 304, the port numbers are read from the dynamic port enable register 200. In an embodiment with four Ethernet ports, one to four ports can be selected through the use of four bits, with each of the respective bits assigned to one of the four Ethernet ports. The Ethernet link for the selected port(s) will not be established until the required delay time is reached. Processing continues with block 306.

At block 306, the delay time to be used for the selected port(s) is read from the dynamic port enable register 200

At block 308, the link enable delay timer is preset with the delay time and is enabled (started). Processing continues with block 310.

At block 310, the processor 108 and host interface circuitry 106 are initialized. Processing continues with block 312.

At block 312, the link enable delay timer is read. If the delay time has expired complete), processing continues with block 314. If not, the link enable delay timer is periodically checked until the delay time has expired and both the media access control layer circuitry 112 and the PHY layer circuitry 114 for the Ethernet port are not enabled. The PHY layer circuitry 114 does not advertise PHY capabilities on the Ethernet link while it is disabled. The media access control layer circuitry 112 does not send or receive packets while it is disabled.

At block 314, the media access control layer circuitry 112 and PRY layer circuitry 114 are initialized and configured to configure the Ethernet port and establish an Ethernet link.

Figure 4:
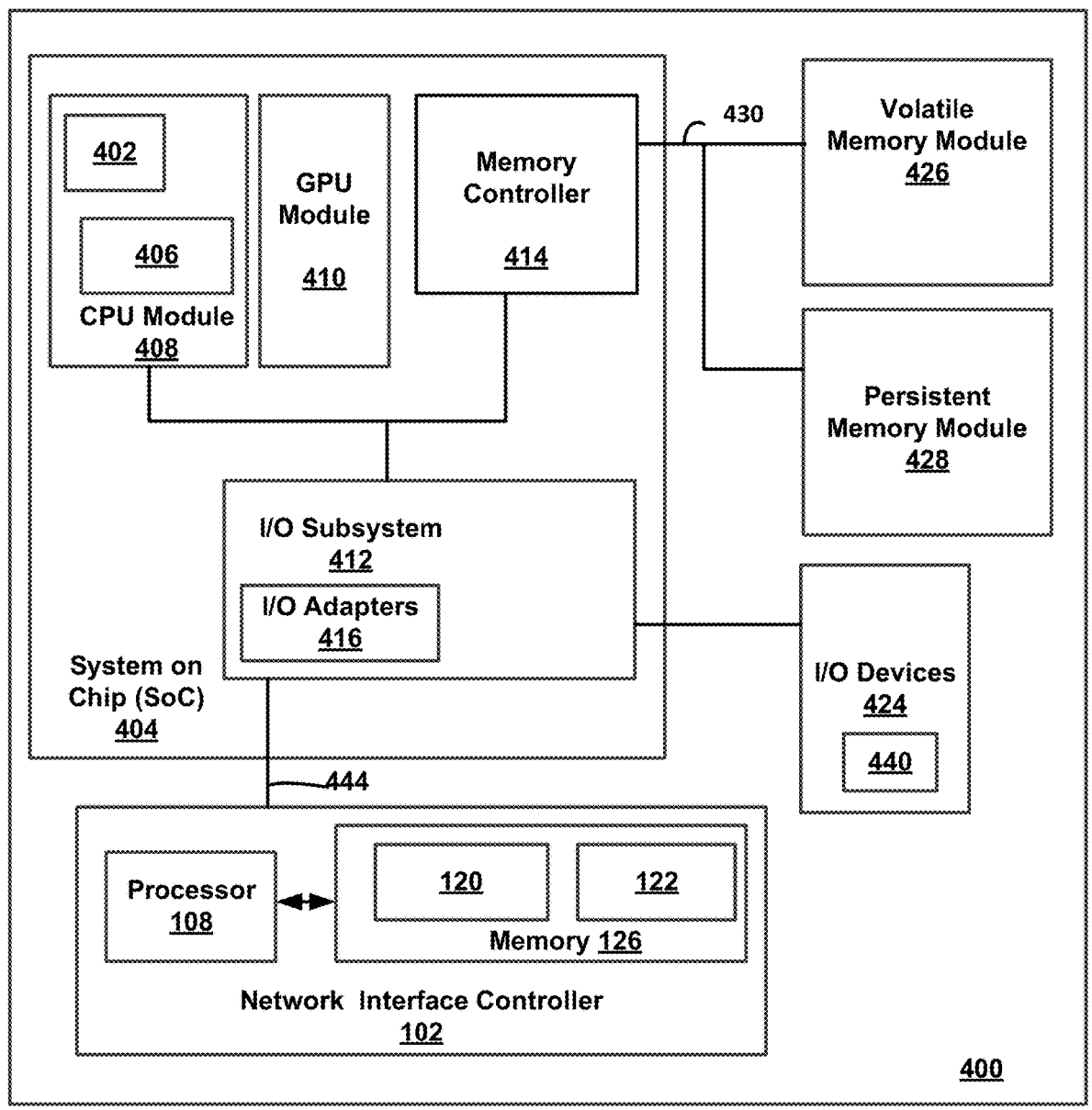
FIG. 4 is a block diagram of an embodiment of a server in a cloud computing system that includes the network interface controller to delay configuring the Ethernet link after a power on reset to allow sufficient time for completion of the configuration of the NIC for post-boot operation.

FIG. 4 is a block diagram of an embodiment of a server 400 in a cloud computing system that includes the network interface controller 102 to delay configuring the Ethernet link after a power on reset to allow sufficient time for completion of the configuration of the NIC 102 for post-boot operation.

Server 400 includes a system on chip (SOC or SoC) 404 which combines processor, graphics, memory, and Input/Output (I/O) control logic into one SoC package. The I/O adapters 416 may include a Peripheral Component Interconnect Express (PCIe) adapter that is communicatively coupled over bus 444 to the NIC 102.

The SoC 404 includes at least one Central Processing Unit (CPU) module 408, a memory controller 414, and a Graphics Processor Unit (GPU) module 410. In other embodiments, the memory controller 414 may be external to the SoC 404. The CPU module 408 includes at least one processor core 402 and a level 2 (L2) cache 406.

Although not shown, the processor core 402 may internally include one or more instruction/data caches (L1 cache), execution units, prefetch buffers, instruction queues, branch address calculation units, instruction decoders, floating point units, retirement units, etc. The CPU module 408 may correspond to a single core or a multi-core general purpose processor, such as those provided by Intel® Corporation, according to one embodiment. In an embodiment the SoC 404 may be a standalone CPU such as an Intel® Xeon® Scalable Processor (SP), an Intel® Xeon® data center (D) SoC, or a smart NIC accelerator card format.

The memory controller 414 may be coupled to a persistent memory module 428 having at least one persistent memory integrated circuit and a volatile memory module 426 having at least one volatile memory integrated circuit via a memory bus 430.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell (PLC) or some other NAND). A NVM device can also include a byte-addressable, write-in-place three dimensional Crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

The Graphics Processor Unit (GPU) module 410 may include one or more GPU cores and a GPU cache which may store graphics related data for the GPU core. The GPU core may internally include one or more execution units and one or more instruction and data caches. Additionally, the Graphics Processor Unit (GPU) module 410 may contain other graphics logic units that are not shown in FIG. 1, such as one or more vertex processing units, rasterization units, media processing units, and codecs.

Within the I/O subsystem 412, one or more I/O adapter(s) 416 are present to translate a host communication protocol utilized within the processor core(s) 402 to a protocol compatible with particular I/O devices. Some of the protocols that I/O adapter(s) 416 may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 416 may communicate with external I/O devices 424 which may include, for example, user interface device(s) including a display and/or a touch-screen display 440, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware such as Intel® QuickAssist Technology, application specific integrated circuits (ASICs), digital signal processors (DSPs), programmable acceleration such as field-programmable gate arrays (FPGAs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A network interface controller comprising:
   one or more physical layer interfaces (PHYs);
   one or more Media Access Controllers, each of the Media Access Controllers associated with one of the PHYs; and
   one or more non-transitory machine-readable storage media comprising a plurality of instructions stored thereon that, in response to being executed, cause the network interface controller to:
      in response to a power on reset, initialize a timer with a delay time for the one or more PHYs to delay configuration of the one or more PHYs for the delay time after the power on reset; and
      after the delay time has expired, configure the one or more PHYs and the one or more Media Access Controllers.

2. The network interface controller of claim 1, wherein the one or more PHYs are disabled during the delay time.

3. The network interface controller of claim 1, wherein the delay time is from 1 to 1023 seconds.

4. The network interface controller of claim 1, wherein each of the PHYs has a same delay time.

5. The network interface controller of claim 1, wherein a first delay time is for a first PHY and a second delay time is for a second PHY.

6. The network interface controller of claim 1, wherein the one or more Media Access Controllers use an Ethernet protocol and number of Media Access Controllers and a number of PHYs is 4.

7. The network interface controller of claim 1, wherein the non-transitory machine-readable storage media is a memory in the network interface controller and the plurality of instructions are executed by a processor in the network interface controller.

8. One or more non-transitory machine-readable storage media comprising a plurality of instructions stored thereon that, in response to being executed, cause a network interface controller to:
   in response to a power on reset, initialize a timer with a delay time for one or more physical layer interfaces (PHYs) to delay configuration of the one or more PHYs for the delay time after the power on reset; and
   after the delay time has expired, configure the one or more PHYs and one or more Media Access Controllers.

9. The one or more non-transitory machine-readable storage media of claim 8, wherein the one or more PHYs are disabled during the delay time.

10. The one or more non-transitory machine-readable storage media of claim 8, wherein the delay time is from 1 to 1023 seconds.

11. The one or more non-transitory machine-readable storage media of claim 8, wherein each of the PHYs has a same delay time.

12. The one or more non-transitory machine-readable storage media of claim 8, wherein a first delay time is for a first PHY and a second delay time is for a second PHY.

13. The one or more non-transitory machine-readable storage media of claim 8, wherein the one or more Media Access Controllers use an Ethernet protocol and a number of Media Access Controllers and a number of PHYs is 4.

14. The one or more non-transitory machine-readable storage media of claim 8, wherein the one or more non-transitory machine-readable storage media is a memory in the network interface controller and the plurality of instructions are executed by a processor in the network interface controller.

15. A system comprising:
   a Central Processing Unit (CPU) module; and
   a network interface controller, coupled to the CPU module, the network interface controller including:
      one or more physical layer interfaces (PHYs);
      one or more Media Access Controllers, each Media Access Controller associated with one of the PHYs; and
      one or more non-transitory machine-readable storage media comprising a plurality of instructions stored thereon that, in response to being executed, cause the network interface controller to:
         in response to a power on reset, initialize a timer with a delay time for at least one of the PHYs to delay configuration of the one or more PHYs for the delay time after the power on reset; and after the delay time has expired, configure the one or more PHYs and the one or more Media Access Controllers.

16. The system of claim 15 wherein the one or more PHYs are disabled during the delay time.

17. The system of claim 15, wherein the delay time is from 1 to 1023 seconds.

18. The system of claim 15, wherein each of the PHYs has a same delay time.

19. The system of claim 15, wherein a first delay time is for a first PHY and a second delay time is for a second PHY.

20. The system of claim 15, further comprising:

a power supply to provide power to the system.

* * * * *